US008477994B1

(12) United States Patent
Noshadi

(10) Patent No.: US 8,477,994 B1
(45) Date of Patent: Jul. 2, 2013

(54) CREATING A NARRATIVE DESCRIPTION OF MEDIA CONTENT AND APPLICATIONS THEREOF

(75) Inventor: Hyduke Noshadi, Northridge, CA (US)

(73) Assignee: Google Inc., Moutain View, CA (US)

( * ) Notice: Subject to any disclaimer, the term of this patent is extended or adjusted under 35 U.S.C. 154(b) by 865 days.

(21) Appl. No.: 12/393,787

(22) Filed: Feb. 26, 2009

(51) Int. Cl.
*G06K 9/00* (2006.01)

(52) U.S. Cl.
USPC ............................ 382/103; 382/175; 382/180

(58) Field of Classification Search
USPC ................. 382/103, 170, 175, 180, 216, 284, 382/305, 306; 345/838, 433; 348/231.2; 358/1.18, 335, 452, 537; 707/2, 6, 7, 104.1, 707/200
See application file for complete search history.

(56) References Cited

U.S. PATENT DOCUMENTS

2006/0251339 A1* 11/2006 Gokturk et al. ............... 382/305
2010/0026842 A1* 2/2010 Ishizaka ..................... 348/231.2

OTHER PUBLICATIONS

Kuo, P., et al. "Building Personal Digital Photograph Libraries: An Approach with Ontology-Based MPEG-7 Dozen Dimensional Digital Content Architecture", *Proceedings of the Computer Graphics International (CGI '04)* IEEE Computer Society, Washington D.C., 2004, 8 pgs.
Tan, T., et al., "*SmartAlbum*—Towards Unification of Approaches for Image Retrieval", *IEEE*, 2002, 4 pgs.
Srihari, R., et al. "Show & Tell: A Semi-Automated Image Annotation System", *IEEE Multimedia*, 2000,11 pgs.
Schreiber, A., et al., "Ontology-Based Photo Annotation", *IEEE Intelligent Systems*, 2001, 9 pgs.
Naaman, M., et al., "Leveraging Context to Resolve Identity in Photo Albums", *JCDL* '05, ACM, Denver, Colorado, 2005, 10 pgs.
Cao, L., et al., "Annotating Collections of Photos Using Hierarchical Event and Scene Models", *IEEE*, 2008, 8 pgs.
Ahn, Byeong-Tae, "Event Semantic Photo Retrieval Management System Based on MPEG-7", *International Conference on Convergence Information Technology*, IEEE Computer Society, Washington D.C., 2007, 6 pgs.

* cited by examiner

*Primary Examiner* — Brian Le
(74) *Attorney, Agent, or Firm* — Sterne, Kessler, Goldstein & Fox PLLC

(57) ABSTRACT

This invention relates to creating a narrative description of media content. In an embodiment, a computer-implemented method describes content of a group of images. The group of images includes a first image and a second image. A first object in the first image is recognized to determine a first content data. A second object in the second image is recognized to determine a second content data. Finally, a narrative description of the group of images is determined according to a parameterized template and the first and second content data.

22 Claims, 4 Drawing Sheets

400

```
402 ⎰ INTRO_SENT: This album contains photos of
    ⎱ {ALLNAMES}'s trip to {REGION_OF_TRIP} during
      {MONTH_OF_TRIP}

404 ⎰ DAY_SITE_SENT: On {DAY},
    ⎱ {PEOPLE_OF_DAY} saw {SITE_NAME} in {CITY}

406 ⎰ DAY_SENT: On {DAY}, {PEOPLE_OF_DAY} went
    ⎱ to {CITY}
```

```
WRITE {INTRO_SENT}

FOR EACH DAY
        IF (SITE FOR DAY)
            WRITE {DAY_SITE_SENT} FOR DAY
        ELSE
            WRITE {DAY_SENT} FOR DAY
```

FIG. 4B

CREATING A NARRATIVE DESCRIPTION OF MEDIA CONTENT AND APPLICATIONS THEREOF

BACKGROUND

1. Field of the Invention

This invention generally relates to annotating media.

2. Background Art

Widespread use of digital cameras has led to individuals amassing large quantities of digital media, such as videos and photos. An individual may share digital media via media sharing web sites, such as the PICASSAWEB site. Some media sharing sites can recognize objects, such as faces and landmarks, from videos and photos.

When a user shares a collection of videos and photos with other people, the user may enter a narrative description of the collection's content. For example, a user may upload hundreds of photos from a vacation to a shared site. Then, the user may enter a description of the vacation into the shared site. In this way, other users of the shared site can quickly read the description to understand the photos' content without having to review hundreds of photos individually.

Systems and methods are needed that automatically generate a narrative description for shared content.

BRIEF SUMMARY

This invention relates to creating a narrative description of media content. In an embodiment, a computer-implemented method describes content of a group of images. The group of images includes a first image and a second image. A first object in the first image is recognized to determine a first content data. A second object in the second image is recognized to determine a second content data. Finally, a narrative description of the group of images is determined according to a parameterized template and the first and second content data. At least one of the steps is performed on a computer.

In another embodiment, a system describes media content. The system includes a media database including a memory that stores a first image and a second image belonging to a group of images. An object recognition module recognizes a first object in the first image to determine a first content data and recognizes a second object in the second image to determine a second content data. Finally, a narrative compiler module determines a narrative description of the group of images according to a parameterized template and the first and second content data.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 4A-B illustrate example templates which may be used in embodiments to create a narrative description.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of this invention create a narrative description of a collection of media, such as photos and videos. Embodiments generate the narrative description by recognizing objects such as faces and landmarks in the media. Embodiments may also extract metadata from the photos and videos. Based on the recognized objects and extracted metadata, a compiler generates the narrative description. The narrative description may be used to describe the collection of media in an interactive way. If the media collection is shared, for example through a website such as a PICASAWEB site, other users may use the narrative text to navigate through the media and view the shared media more easily.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
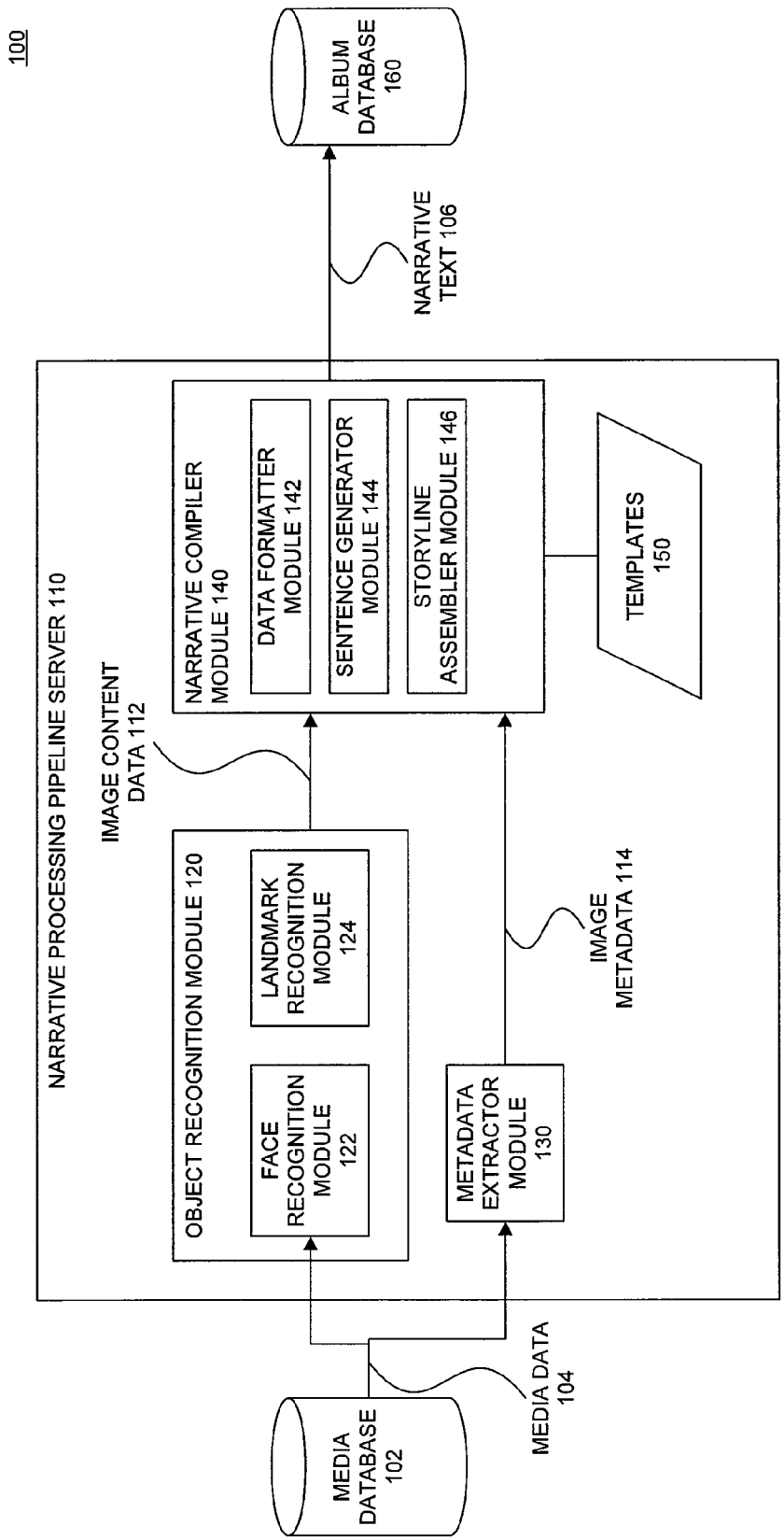
FIG. 1 is a diagram illustrating a system to create a narrative description of media content according to an embodiment of the present invention.

FIG. 1 is a diagram illustrating a system 100 that generates a narrative description of media content according to an embodiment. System 100 includes a media database 102, narrative processing pipeline server 110 and album database 160. Narrative processing pipeline server 110 includes various component modules including an object recognition module 120, metadata extractor module 130, narrative compiler module 140 and templates 150.

In general, system 100 operates as follows. Narrative processing pipeline server 110 extracts media data 104 from media database 102. From media data 104, object recognition module 120 recognizes image content data 112, and metadata extractor module 130 extracts image metadata 114. Using image content data 112 and image metadata 114, narrative compiler module 140 generates narrative text 106. Finally, narrative processing pipeline server 110 stores narrative text 106 in album database 160. In this way, system 100 generates narrative text 106 describing media data 104. Each of the components and their operation is described in more detail below.

Media database 102 may store any type of media data such as image or video data. The images may, for example, be photographs taken from a digital camera. The images may be encoded in JPEG, TIFF or other image file formats. Each image may have metadata associated with the image. For example, an image may have an exchangeable image file format (EXIF) header that stores information such as a time when the photograph of the image was taken, a location where the photo was taken and information about the camera that took the photo, such as make, model, focal length and zoom. The time the image was taken may the time the camera was exposed. A video includes a sequence of frames. Each frame includes an image. The videos may also be captured using a digital camera able to capture video. In an example, media database 102 may be coupled to a media sharing site (not shown), such as a PICASSAWEB site. A user may upload the media from the media sharing site to media database 102.

Media data 104 is retrieved from media database 102. Narrative processing pipeline server 110 may retrieve media data 104 from media database 102 using, for example, an SQL select statement. Alternatively, narrative processing pipeline server 110 could access media database 102 using a web service. Media database 102 may have an intermediate server that may push media data 104 to processing pipeline server 110.

Media data 104 may include a group of image files. The group of image files may be photographs, frames from one or more videos, or a combination of both. The image files may include image content and metadata. When narrative processing pipeline server 110 receives media data 104, it sends media data 104 to object recognition module 120 and metadata extractor module 130.

Object recognition module 120 interprets the content of media data 104 to recognize objects. For example, media data 104 may include an image, and object recognition module 120 may recognize an object in that image. In another example, object recognition module 120 may recognize an object in one or more frames of a video. Object recognition module 120 may be any type of object recognition module as known to those skilled in the art. In general, object recognition may include two steps. First, a portion of an image including an object is detected. Second, the portion of the image is put through a function, such as a classifier function, that identifies the object.

Object recognition module 120 includes two sub-modules configured to detect different types of objects—a face recognition module 122 and a landmark recognition module 124. Object recognition module 120 may also include other recognition modules as are known to those of skill in the art.

In some embodiments, object recognition module 120 may use hidden Markov models to select and match particular objects to an object in a set of known objects. In the case where media data 104 is a video, object recognition module 120 may track an object across one or more frames and then recognize the object based on the tracked frames. One example of such object detection and recognition method may be found in U.S. patent application Ser. No. 12/143,590 entitled "Object Tracking in Video with Visual Constraints", which is incorporated by reference herein in its entirety. This technique may be advantageous when used by face recognition module 122 to detect faces. Another approach to face recognition is described in Lui and Chen, "Video-based Face Recognition Using Adaptive Hidden Markov Models", 2001, *CVPR*. Once the object is tracked, the object may be identified. For example, face recognition module 122 may track faces and identify those faces.

Landmark recognition module 124 detects a portion of the image that has a landmark and identifies the landmark. One example of landmark recognition module 124 is described in U.S. patent application Ser. No. 12/119,359 entitled "Automatic Discovery of Popular Landmarks", which is incorporated by reference herein in its entirety. Landmark recognition module 124 may, for example, use visual clustering to recognize landmarks.

By recognizing an object (such as a face or landmark) in images, object recognition module 120 determines image content data 112. Image content data 112 may be, for example, a list of objects found in a particular image.

In addition to using media data 104 to determine image content data 112, narrative processing pipeline server 110 may extract metadata from media data 104 using metadata extractor module 130.

Metadata extractor module 130 may, for example, extract metadata from media data 104. As mentioned earlier, media data 104 may be, for example, a collection of media files, and each media file may include metadata. In an embodiment, a media file may be a photographic image file, such as a JPEG or TIFF. The photographic image file may include an EXIF header with data about the image. An EXIF header may, for example, include data such as when the photo was taken. Some cameras may include a location sensor, such as a GPS sensor. Image files generated by those cameras may include a location where each photo was taken in their EXIF headers. For example, the EXIF header may have latitude and longitude values corresponding to where the picture was taken. In this way, metadata extractor module 130 reads metadata from media data and sends it to narrative compiler module 140 as an image metadata 114.

Using image metadata 114 and image content data 112, narrative compiler module 140 generates a narrative text 106 describing the collection of media. In an example, object recognition module 120 and metadata extractor module 130 may, for example, interpret several images, perhaps a whole album of images and create image content data 112 and image metadata 114 for each of those images. Narrative compiler module 140 then interprets the image content data 112 and image metadata 114 together to determine a single narrative text 106 that describes the entire group of images. To create narrative text 106, narrative compiler module 140 may use one or more templates 150 to transform the image content data 112 and image metadata 114 into narrative text 106.

Narrative compiler module 140 includes a data formatter module 142, a sentence generator module 144, and a storyline assembler module 146. As mentioned earlier, narrative compiler module 140 may use one or more templates 150 to determine narrative text 106. Templates 150 may include one or more parameters that are used to determine a sentence. The parameters in templates 150 may, for example, expect data in a format different from image content 112 and image metadata 114.

Data formatter module 142 transforms image metadata 114 and image content data 112 to the format expected by the parameters of templates 150. For example, image metadata 114 may have the location where the photo of the image was taken in GPS coordinates. A parameter in template 150 may require the name of the city where the picture was taken. In this example, data formatter module 142 would determine a city that is located at the GPS location in image metadata 114.

In addition, data formatter module 142 may aggregate one or more pieces of data from image content data 112 and image metadata 114 or data from across multiple images to determine data necessary for the parameters in the templates 150. For example, a first photo from a collection of photos may include Big Ben, and a second photo from the collection may include the Eiffel Tower. Templates 150 may require a parameter that describes the entire region where the collection of photos was taken. In that case, data formatter module 142 may determine that Big Ben is in London, England and that the Eiffel Tower is in Paris, France. So, the collection of photos includes photos taken in London, England and Paris, France. The template parameter in this example expects the region including both London, England and Paris, France.

To determine this region, data formatter module 142 may look to a hierarchy of locations. The lowest entry in the hierarchy of locations that includes both London and France may be the continent Europe. Thus, data formatter module 142 may determine that the region where the collection of photos was taken is Europe. In this way, data formatter module 142 adapts image content data 112 and image metadata 114 to the format required by templates 150.

Once data formatter module 142 formats the data, sentence generator module 144 may generate one or more sentences. For example, sentence generator 144 may insert the formatted data into fields as specified in templates 150. An example operation of sentence generator 144 is described in more detail below.

Once sentence generator 144 generates the one or more sentences, storyline assembler module 146 may assemble the sentences to generate a narrative. Storyline assembler 146 may, for example, use a script that defines how the storyline is assembled from the sentences. Using these scripts storyline assembler module 146 generates narrative text 106. An example operation of storyline assembler module 146 is described in more detail below.

Narrative text 106 is stored in album database 160. Narrative text 106 may be, for example, an ASCII string that includes the narrative description. The narrative description is a description of a collection of media. In an example where the collection of media is an album of photos taken from a trip, the narrative description may tell a story of what happened during the trip. Album database 160 may be coupled to a photosharing site such as a PICAS SAWEB site. The photosharing site may, for example, display narrative text 106 to a user. A user can review an image or a group of images by merely reading the automatically generated narrative describing the images. The user can read a summary of the images without having to look at each individual image.

Narrative processing pipeline server 110 may be implemented on any type of computing device. The computing device may include at least one processor, a main memory, preferably random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit represents a floppy disk, magnetic tape, optical disk, etc. which is read by and written to by the removable storage drive. As will be appreciated, the main memory and the secondary memory may include a computer usable storage medium having stored therein computer software and/or data. The computer software may include an operating system and processes that may be run by a processor. The computing device may also have multiple processors and multiple shared or separate memory components. For example, the computing device may be a clustered computing environment or server farm.

Each of object recognition module 120, face recognition module 122, landmark recognition module 124, metadata extractor module 130, narrative compiler module 140, data formatter module 142, sentence generator module 144, and storyline assembler module 146 may be implemented in hardware, software, firmware, or any combination thereof.

Media database 102 and album database 160 may be any type of data storage known to those of skill in the art. In an example, the data storage may be a database management system, such as an ORACLE database or other databases known to those skilled in the art. Media database 102 may store any type of media such as images or video.

Although the invention is described with respect to server 110, a person of skill in the art would recognize that the invention may also be implemented on a personal computer or other computing device such as a mobile device.

Figure 2:
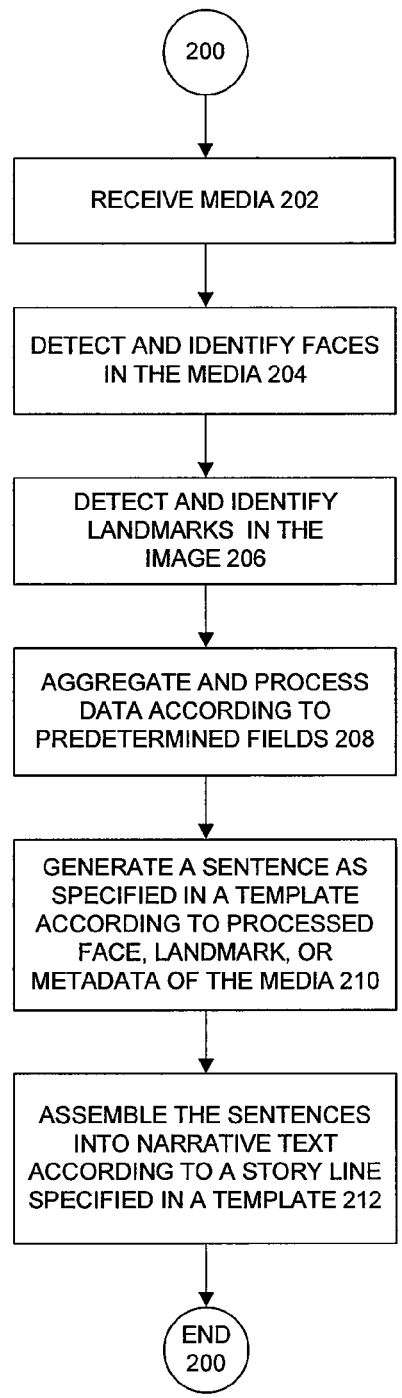
FIG. 2 is a flowchart illustrating a method for creating a narrative description of media content according to an embodiment of the present invention.

FIG. 2 is a flowchart illustrating method 200 for creating a narrative description of media content according to an embodiment of the present invention. Method 200 may be used in operation of system 100 in FIG. 1. For clarity, method 200 is described with examples in FIGS. 3A-C and FIGS. 4A-B. However, method 200 should not be limited thereto.

Method 200 begins at step 202 with receiving media. The media may, for example, be a collection of images. The images may be frames from a video. Alternatively, the images may be photographs taken from a digital camera. The images may be encoded in image files. The image files may include metadata about the image.

Figure 3A:
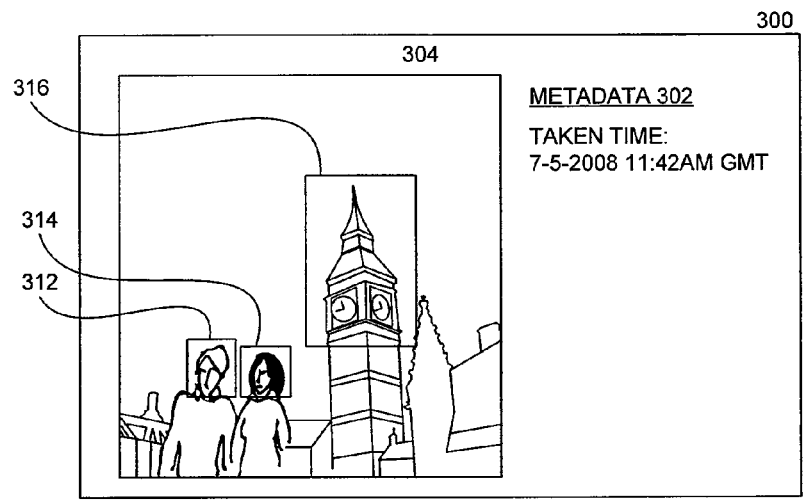
FIGS. 3A-C illustrate example photos which may be used in embodiments to create a narrative description.
Figure 3B:
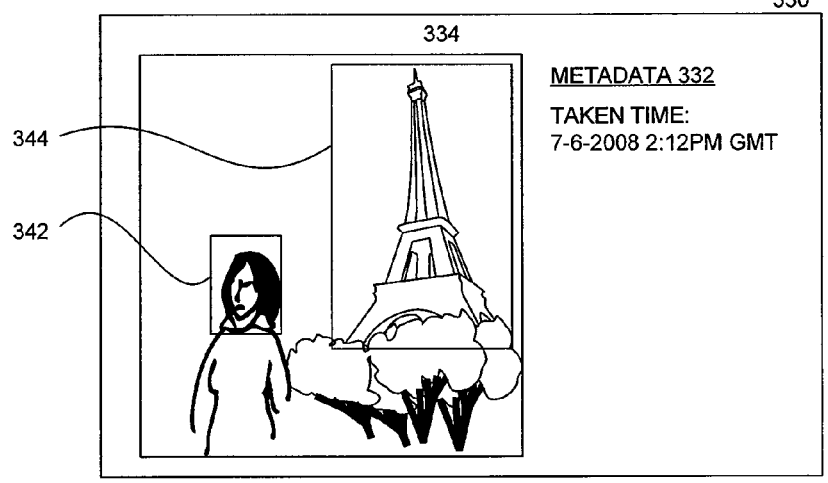
Figure 3C:
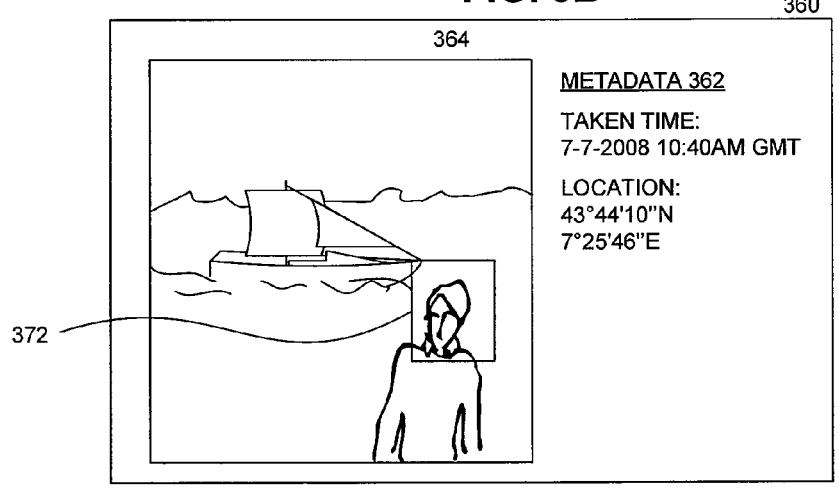

Example images are shown in FIGS. 3A-C. FIG. 3A depicts an image file 300; FIG. 3B depicts an image file 330; FIG. 3C depicts an image file 360. Each image file includes both an image and metadata describing the image. Image file 300 includes an image 304 and metadata 302. Image file 330 includes an image 334 and metadata 332. Image file 360 includes an image 364 and metadata 362.

At step 204, faces are recognized in the images. As mentioned earlier, any type of face recognition algorithm may be used. Referring to the example in FIGS. 3A-C, faces are detected at position 312 and 314 in image 304. In an example, face 312 is identified as "John." In another example, face 314 is identified as "Alice." In image 334, a face 342 is detected. In the example, face 342 is also identified as Alice. In image 364, a face 372 is detected. Face 372 is identified as John. In sum, a face recognition algorithm determines that John is in images 304 and 364 and Alice is in images 304 and 334.

At step 206, landmarks are recognized in the images. As mentioned earlier, any type of landmark recognition algorithm may be used. In image 304, landmark 316 is detected. Landmark 316 is identified as Big Ben. In image 334, a landmark 344 is detected. Landmark 344 is identified as the Eiffel Tower. In image 364, no landmarks are recognized. In sum, a landmark recognition algorithm determines that image 304 shows Big Ben and image 334 shows the Eiffel tower.

At step 208, the data determined in steps 204 and 206 are processed into the format required by parameters of one or more templates. As described above, the template's parameters may, for example, expect data in different formats. In that case, the data may be transformed into the required format. In addition, the parameters may require that the image content data and image metadata be aggregated.

Examples of parameterized fields are illustrated in a template 400 in FIG. 4A. Template 400 includes sentence templates 402, 404, and 406. Sentence template 402 includes parameters allnames, region_of_trip, and month_of_trip.

The allnames parameter may expect a list of the names of all the individuals recognized in a collection of images. The all_names parameter may require that all the names be aggregated and formatted into a list. In FIGS. 3A-C, the faces of John and Alice were recognized in the collection of images. So, the all_names parameter is "John and Alice".

The region_of_trip parameter may expect the largest region in the hierarchy of regions that include locations associated with all the images in the collection of images. In images 304 and 334, the Big Ben and Eiffel Tower landmarks were recognized. Locations of those landmarks may be determined, for example, by looking the locations up in a table. Big Ben and the Eiffel Tower are located in London, England and Paris, France respectively. Alternatively, the location of landmarks such as the Eiffel Tower and Big Ben may be determined using geo-clustering, such as the geo-clustering described in U.S. patent application Ser. No. 12/119,359 entitled "Automatic Discovery of Popular Landmarks". In image 364 in FIG. 3C, no landmarks were recognized. However, image 364 has associated metadata 362 with a GPS coordinate of the photo. This GPS location is in the city-state Monaco. In sum, the photos of the images where taken in Monaco, Paris, France, and London, England. The region_of_trip field may expect a region that encompasses all three locations.

A hierarchy of regions may be used to determine a region that encompasses all three locations. For example, the smallest region in a hierarchy of regions that includes all three locations may be Europe. Thus, the region_of_trip parameter may be "Europe."

Finally, sentence template 402 includes a parameter month_of_trip. The parameter month_of_trip may expect a month or set of months that encompass the times when all the photos were taken. In FIGS. 3A-C, each image's metadata includes a timestamp indicating when the photo of the image was taken. Image metadata 302 has a timestamp "7-5-2008 11:42 AM GMT". Image metadata 332 has a timestamp "7-6-2008 2:12 PM GMT". Image metadata 362 has a timestamp "7-7-2008 10:40 AM GMT". These timestamps all fall in July, 2008. Thus, month_of_trip field is "July, 2008".

Once the fields for sentence template 402 are determined, sentence 402 may be compiled into a sentence at step 210. The fields are inserted into the template "This album contains photos of {allnames}'s trip to {region_of_trip} during {month_of_trip}". The resulting sentence may be "This album contains photos of John and Alice's trip to Europe during July, 2008."

This process is repeated for sentence templates 404 and 406. In an example, for each day in the trip, a sentence according to either sentence template 404 or 406 is determined. Sentence template 404 may be used for days when an individual has visited a recognizable landmark and sentence template 406 may be used for days when an individual has not visited a recognizable landmark. For example, on July 5 and 6, individuals visited identifiable landmarks. For those days, two sentences may be generated according to sentence template 404: "On July 5, John and Alice visited the Big Ben in London, England" and "On July 6, Alice visited the Eiffel Tower in Paris, France". On July 7, no recognizable landmark is visited. However, a location visited may still be determined according to the GPS coordinates in metadata 362 of photo file 360. The GPS coordinates 43° 44' 10" N, 7° 25' 46" E are in the city of Monaco. So, inserting this location into sentence template 406, the sentence "On July 7, John went to Monaco" is generated.

Referring back to FIG. 2, once all the individual sentences are determined at step 210, the sentences may be assembled into narrative text according to a storyline specified in a template at step 212. A storyline template specifies how to assemble sentences into narrative text. A storyline template may have parameters for the sentences determined as defined in the sentence templates. Further, in an example, the storyline template may specify how to form the sentences into a narrative using a scripting language such as PERL. FIG. 4B illustrates an example storyline template 450.

Storyline template 450 illustrates pseudo code defining how to assemble the sentences from template 400 into a narrative. Storyline template 450 begins by writing out the introductory sentence defined by sentence template 402. After writing the introductory sentence, storyline template 450 enters into a loop. The loop repeats for each day of the trip. For each day, if a landmark is identified among the photos taken that day, a sentence generated according to sentence template 404 may be used. If no landmark is identified, a sentence generated according to sentence template 406 may be used. Applying the photos in FIGS. 3A-C to the templates in FIGS. 4A-B, the resulting narrative text may be:

This album contains photos of John and Alice's trip to Europe during July, 2008. On July 5, John and Alice visited Big Ben in London, England. On July 6, Alice visited the Eiffel Tower in Paris, France. On July 7, John went to Monaco.

In this way, a narrative description is generated that describes the content of a collection of photos. The narrative description may be used in a photosharing website, such as PICASSAWEB, to describe the contents of a photo album.

In an embodiment, the sentences defined by sentence template 400 may be generated in real time as needed by the storyline template 450. Further, the sentences and storyline may be generated together based on a single template. As mentioned earlier, this template may be formatted as a script, such as a PERL script. These templates may be developed by a user community and shared over the web.

In an alternative embodiment, the templates may be a hard coded program module. The program module may be a component of a narrative compiler, such as narrative compiler module 140 in FIG. 1.

As examples, embodiments of the invention are described with respect to face recognition and object recognition. However, other types of object recognition may be used as are known to those of skill in the art.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for describing content of a group of images, the group of images including a first image and a second image, comprising:
    (a) recognizing a first object in the first image to determine a first content data that identifies the first object;
    (b) recognizing a second object in the second image to determine a second content data that identifies the second object; and (c) generating, by a computer, a narrative description of the group of images according to a parameterized template that specifies how to construct the narrative description from the first and second content data, wherein each of the steps is performed on the computer.

2. The method of claim 1, wherein the recognizing (a) comprises recognizing a face in the first image to determine the first content data, wherein the first content data corresponds to an identity of the face.

3. The method of claim 1, wherein the recognizing (a) comprises recognizing a landmark in the first image to determine the first content data, wherein the first content data corresponds to the landmark.

4. The method of claim 1, wherein the recognizing (a) comprises extracting a metadata from the first image, and
wherein the determining (c) comprises determining the narrative description according to the metadata.

5. The method of claim 4, wherein the extracting the metadata comprises extracting a time when the first image was exposed.

6. The method of claim 4, wherein the extracting the metadata comprises extracting a location where the first image was exposed.

7. The method of claim 4, wherein the extracting the metadata comprises reading an EXIF header of the first image.

8. The method of claim 1, wherein the determining (c) comprises:
determining a value based on the first content data and the second content data; and
inserting the value into a parameter location in the template.

9. The method of claim 1, wherein the determining (c) comprises:
generating a plurality of sentences based on the template; and
assembling the sentences to form the narrative description.

10. The method of claim 1, wherein the group of images are at least a portion of a video and the first and second images are frames from the video.

11. The method of claim 1, wherein the narrative description describes content of the first and second images.

12. A system for describing media content, comprising:
a media database including a memory that stores a first image and a second image belonging to a group of images;
an object recognition module that recognizes a first object in the first image to determine a first content data that identifies the first object and recognizes a second object in the second image to determine a second content data that identifies the second object; and
a narrative compiler module that generates, by a computer, a narrative description of the group of images according to a parameterized template that specifies how to construct the narrative description from the first and second content data.

13. The system of claim 12, wherein the first object is a face and the first content data corresponds to an identity of the face.

14. The system of claim 12, wherein the first object is a landmark and the first content data corresponds to the landmark.

15. The system of claim 12, further comprising:
a metadata extractor module that extracts a metadata from the first image,
wherein the narrative compiler module determines the narrative description according to the metadata.

16. The system of claim 15, wherein the metadata comprises a time when the first image was exposed.

17. The system of claim 15, wherein the metadata includes a location where the first image was exposed.

18. The system of claim 15, wherein the metadata extractor module reads an EXIF header of the first image to extract the metadata.

19. The system of claim 12, wherein the narrative compiler module comprises:
a data formatter module that determines a value based on the first content data and the second content data; and
a sentence generator module that inserts the value into a parameter location of the template.

20. The system of claim 12, wherein the narrative compiler module comprises:
a sentence generator module that determines a plurality of sentences based on the template; and
a storyline assembler module that assembles the plurality of sentences to form the narrative description.

21. The system of claim 12, wherein the group of images are at least a portion of a video and the first and second images are frames from the video.

22. The system of claim 12, wherein the narrative description describes content of the first and second images.

* * * * *